Alpers

Mar. 21, 1972

[54] IMAGE STABILIZATION SYSTEM

[72] Inventor: Frederick C. Alpers, Riverside, Calif.

[73] Assignee: The United States of America as represented by the Secretary of the Navy

[22] Filed: Sept. 1, 1965

[21] Appl. No.: 485,675

[52] U.S. Cl.................................250/203, 178/6.8, 250/234, 350/16
[51] Int. Cl..........................................G01s 3/78
[58] Field of Search ..........................350/16, 272, 273, 274; 250/203 CT, 234; 178/6.8; 33/46.5

[56] References Cited

UNITED STATES PATENTS 2,899,882    8/1959    Wylie et al.............................33/46.5
3,242,344    3/1966    Zuckerbraun ..........................350/272
3,293,360    12/1966   Smith......................................178/6.8

FOREIGN PATENTS OR APPLICATIONS 684,435    12/1952    Switzerland ................................88/14
675,949    12/1963    Canada........................................88/1

*Primary Examiner*—Rodney D. Bennett, Jr.
*Assistant Examiner*—S. C. Buczinski
*Attorney*—G. J. Rubens, J. M. St. Amand and T. M. Phillips

[57] ABSTRACT

A device for image stabilization in an electro-optical guided missile which utilizes a feedback loop that includes a lens, signal detecting means and a servomotor for moving the lens.

3 Claims, 3 Drawing Figures

PATENTED MAR 21 1972  3,651,325

FREDERICK C. ALPERS
INVENTOR.

BY *J. M. Phillips*
*J. M. St. Amand*

ATTORNEYS

IMAGE STABILIZATION SYSTEM

The invention herein described may be manufactured and used by or for the Government of the United States of America for governmental purposes without the payment of any royalties thereon or therefor.

The present invention relates to image stabilization systems and more particularly to image stabilization systems for electro-optical tracking in guided missiles.

When, for military purposes, an electro-optical camera or seeker is carried on a moving platform (such as a missile), it is necessary to space-stabilize the image obtained on the faceplate of the imaging tube or sensor in order to obtain an image which does not "dance" about or smear in response to motions of the platform.

Various means have been provided for achieving image stabilization: where a space-stabilized platform was provided for the lens and imaging tube, costly and large platforms were required where size must include the free space around the platform to allow for movement; where servo mirrors were introduced in front of the lens to reduce space requirements they introduce complexity since the mirrors cannot be directly space-stabilized due to the doubling of optical deviation angles with reflections at the mirror surfaces; where only the lens is pivoted and maintained in a fixed orientation while other portions are unstabilized, only small angular motions are possible, since for lens axis positions other than perpendicular to the imaging tube face the image becomes defocused and blurred at all but the center point; and where stabilization is effected electronically within suitable types of imaging tubes, stabilization can be effected only over small angles.

An object of the present invention is to provide a means of image stabilization by translational motion which selects for viewing purposes a particular section of a wide-angle image.

Other objects and many of the attendant advantages of this invention will become readily appreciated as the same becomes better understood by reference to the following detailed description when considered in connection with the accompanying drawings wherein.

Figure 1:
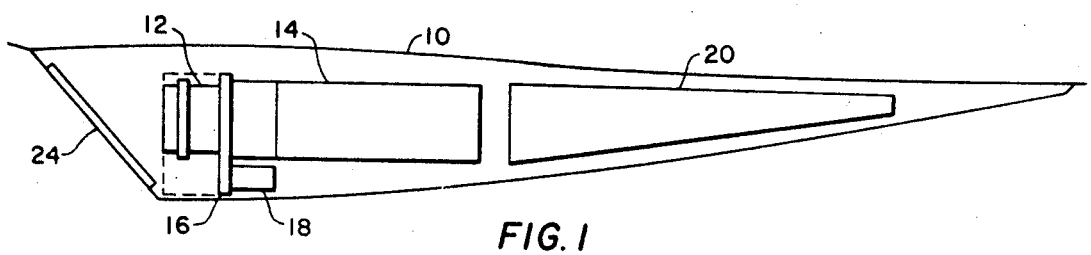
FIG. 1 shows an arrangement of seeker equipment embodying the invention within the pod of a missile.
Figure 2:
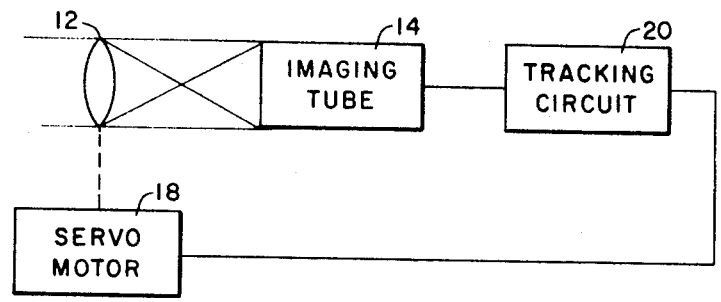
FIG. 2 is a block diagram showing the relation of the invention to the seeker system.
Figure 3:
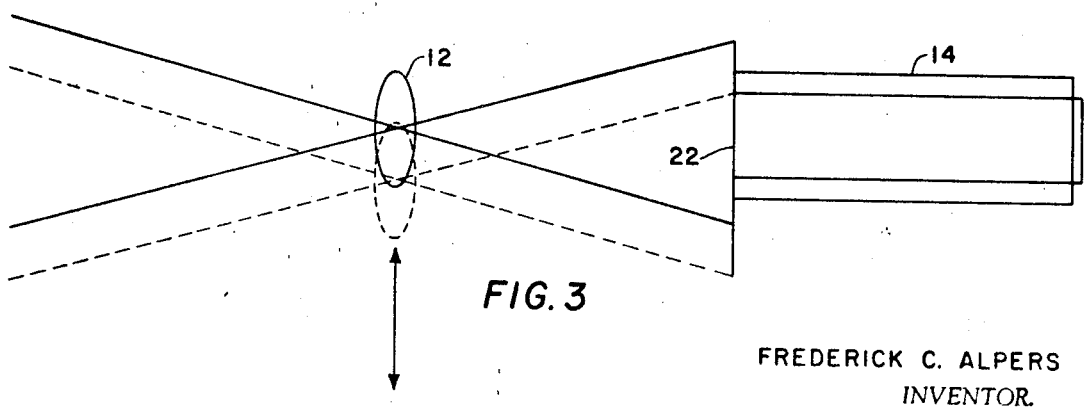
FIG. 3 shows the variation in look angle resulting from the invention.

Referring now to the drawings, wherein like reference characters designate like or corresponding parts throughout the several views, there is shown in FIG. 1 an underslung fairing or pod 10 of a missile (not shown). Within pod 10 there is housed a wide-angle lens 12 mounted in front of the faceplate of an image dissector tube 14. Attached to the lens mounting is a drive mechanism 16 which transmits translational motion in the vertical direction (as shown by the double-headed arrow). Lens 12 is driven by drive motor 18 in response to an output voltage of tracking circuit 20. Tracking circuit 20 may be of the type shown and described in my copending application Ser. No. 485,676 filed Sept. 1, 1965 for Passive Electrical Optical Seeker. As can be seen in FIG. 3, the image projected by lens 12 is considerably larger than the area of the faceplate 22 of imaging tube 14. Different portions of the image will be focused on faceplate 22 when lens 12 is at either extreme of its possible translational motion or at any point between those extremes.

The terrain of interest is viewed by lens 12 through the glass window 24 and image dissector tube 14 is made to view portions of the terrain which lie from slightly above the axis of the missile to considerably below it, depending upon the vertical position of lens 12 at the time.

When the missile is launched in a loft maneuver, lens 12 should be positioned at the lowest possible point, since the pitch angle between the missile longitudinal axis and the missile-to-target line of sight will be greatest at the instant of launch. As the missile flies its ballistic trajectory, this angle will gradually diminish, and the lens pitch control from tracking circuit 20 will cause drive motor 18 to gradually raise lens 12 so that the image of the desired target will remain focused near the center of the faceplate of tube 14 during the flight of the missile. For a wide-angle lens with a field of view in excess of 50°, look angles ranging from +5° to −25° in the vertical plane have been observed. These angles refer to the position with respect to the missile flight axis (nominally 3° below the longitudinal axis to provide for angle of attack) of the object whose image appears at the center of the faceplate of tube 14.

Obviously many modifications and variations of the present invention are possible in the light of the above teachings. It is therefore to be understood that within the scope of the appended claims the invention may be practiced otherwise than as specifically described.

What is claimed is:

1. In an image stabilization system for use in missiles and the like, the combination comprising:
    a. an image dissector tube having a faceplate on which an image of a target of interest can be focused,
    b. a wide-angle lens movably mounted before the faceplate of said image dissector tube for projecting an image larger than the area of said faceplate,
    c. means coupled to said wide-angle lens for moving said lens in a vertical direction to cause the target of interest to be continually focused on the faceplate of said image dissector tube during changes in pitch of the missile.

2. In an image stabilization system for use in missiles and the like, the combination comprising:
    a. an imaging tube having a faceplate on which an image of a target of interest can be focused,
    b. a wide-angle lens movably mounted before the faceplate of said image dissector tube for projecting an image larger than the area of said faceplate,
    c. means coupled to said wide-angle lens for moving said lens in a vertical direction to cause the target of interest to be continually focused on the faceplate of said imaging tube during changes in pitch of the missile.

3. In an image stabilization system for use in missiles and the like, the combination comprising:
    a. an image dissector tube having a faceplate on which an image of a target of interest can be focused,
    b. a wide-angle lens movably mounted before said faceplate for projecting an image larger than the area of said faceplate,
    c. drive motor means coupled to said wide-angle lens for driving said lens in a plane orthogonal to the lens axis in response to pitch signals from the missile guidance.

* * * * *